(12) United States Patent
Otto

(10) Patent No.: US 6,496,121 B2
(45) Date of Patent: Dec. 17, 2002

(54) METHODS AND APPARATUS FOR AN ELECTRONIC SHELF LABEL COMMUNICATION SYSTEM

(75) Inventor: Jerome A. Otto, Centerville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/783,365

(22) Filed: Feb. 14, 2001

(65) Prior Publication Data
US 2002/0109603 A1 Aug. 15, 2002

(51) Int. Cl.$^7$ ................................................ G08B 3/00
(52) U.S. Cl. .................. 340/691.6; 340/571; 340/691.1
(58) Field of Search .......................... 340/5.61, 10.52, 340/10.6, 825.49, 5.91, 10.3, 571, 572.4, 10.32, 691.1, 691.6; 235/375, 383; 714/811; 705/16

(56) References Cited

U.S. PATENT DOCUMENTS

| | | | | |
|---|---|---|---|---|
| 5,426,667 A | * | 6/1995 | van Zon | 375/219 |
| 5,640,683 A | | 6/1997 | Evans et al. | 455/45 |
| 5,758,064 A | * | 5/1998 | Zimmerman et al. | 340/10.2 |
| 5,771,005 A | * | 6/1998 | Goodwin, III | 340/5.91 |
| 5,828,693 A | * | 10/1998 | Mays et al. | 375/202 |
| 5,841,365 A | * | 11/1998 | Rimkus | 340/5.61 |
| 5,880,449 A | * | 3/1999 | Teicher et al. | 235/383 |
| 6,100,790 A | * | 8/2000 | Evans et al. | 340/571 |
| 6,108,367 A | * | 8/2000 | Herman et al. | 375/141 |
| 6,311,308 B1 | * | 10/2001 | Adamec | 714/811 |

* cited by examiner

Primary Examiner—Van Trieu
(74) Attorney, Agent, or Firm—Priest & Goldstein PLLC

(57) ABSTRACT

Techniques for an electronic shelf label (ESL) system which uses an ESL's liquid crystal display (LCD) to transmit information to a relay unit, or CBS, by reflecting infrared (IR) or visible light to the relay unit. In a first embodiment, a plurality of IR light sources flood the area where the ESL is located. To transmit a message to the relay unit, the ESL reflectively modulates the IR light by blinking, or turning on and off, at least one segment of the LCD display. The relay unit then receives and interprets the modulated reflected IR light. In a second embodiment, the relay unit does not generate IR light. Instead, the ESL reflectively modulates the visible light present in the retail establishment to transmit a message to the relay unit. The relay unit may use one or more cameras to receive this reflectively modulated visible light.

15 Claims, 3 Drawing Sheets

METHODS AND APPARATUS FOR AN ELECTRONIC SHELF LABEL COMMUNICATION SYSTEM

FIELD OF THE INVENTION

The present invention relates generally to improvements in electronic shelf label (ESL) systems used in transaction establishments. More specifically, the present invention relates to advantageous aspects of a wireless ESL communication system.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. Price information displayed by the ESLs is obtained from a price look-up (PLU) data file. The central server sends messages, including price change messages, to the ESLs through a communication base station (CBS) which may be mounted in the ceiling of the retail establishment.

The communications link from the CBS to an ESL, known as the "downlink", uses infrared (IR) or radio frequency (RF) technology. To ensure that a message transmitted to the ESL was properly received, the ESL transmits a positive acknowledgement over an "uplink" communication path to the CBS, which in turn relays the acknowledgment to the central server. The downlink communications path is separate from and may employ different technology than the uplink communication path, since the uplink path transmits much less data than the downlink path. For example, the ESL may transmit an acknowledgement which consists of a single status byte.

Not only is it important for the communication links to be reliable, but for ESL systems to be cost effective, ESLs must be inexpensive and the cost of the infrastructure, such as the CBS, kept to a minimum. Since the downlink is transmitted from the CBS which may be operated by an external power source, providing transmission power for the downlink is not usually a concern. However, the uplink signal is originated by the ESL, which is typically powered by a battery. Since battery life of the ESL is an important design consideration, utilizing an active uplink which actively transmits an RF or IR signal may consume excessive power and reduce battery life.

Thus, it would be desirable to provide a reliable uplink communication path for an ESL system which consumes minimal battery power while providing a large communication range.

SUMMARY OF THE INVENTION

The present invention advantageously provides methods and apparatus for an ESL system which uses the ESL's liquid crystal display (LCD) to transmit information to a relay unit, or CBS, by reflecting infrared (IR) or visible light to the relay unit. In a first embodiment, a plurality of IR light sources flood the area where the ESL is located. To transmit a message to the relay unit, the ESL reflectively modulates the IR light by blinking, or turning on and off, at least one segment of the LCD display. The relay unit then receives and interprets the modulated reflected IR light. In a second embodiment, the relay unit does not generate IR light. Instead, the ESL reflectively modulates the visible light present in the retail establishment to transmit a message to the relay unit. The relay unit may use one or more cameras to receive this reflectively modulated visible light.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
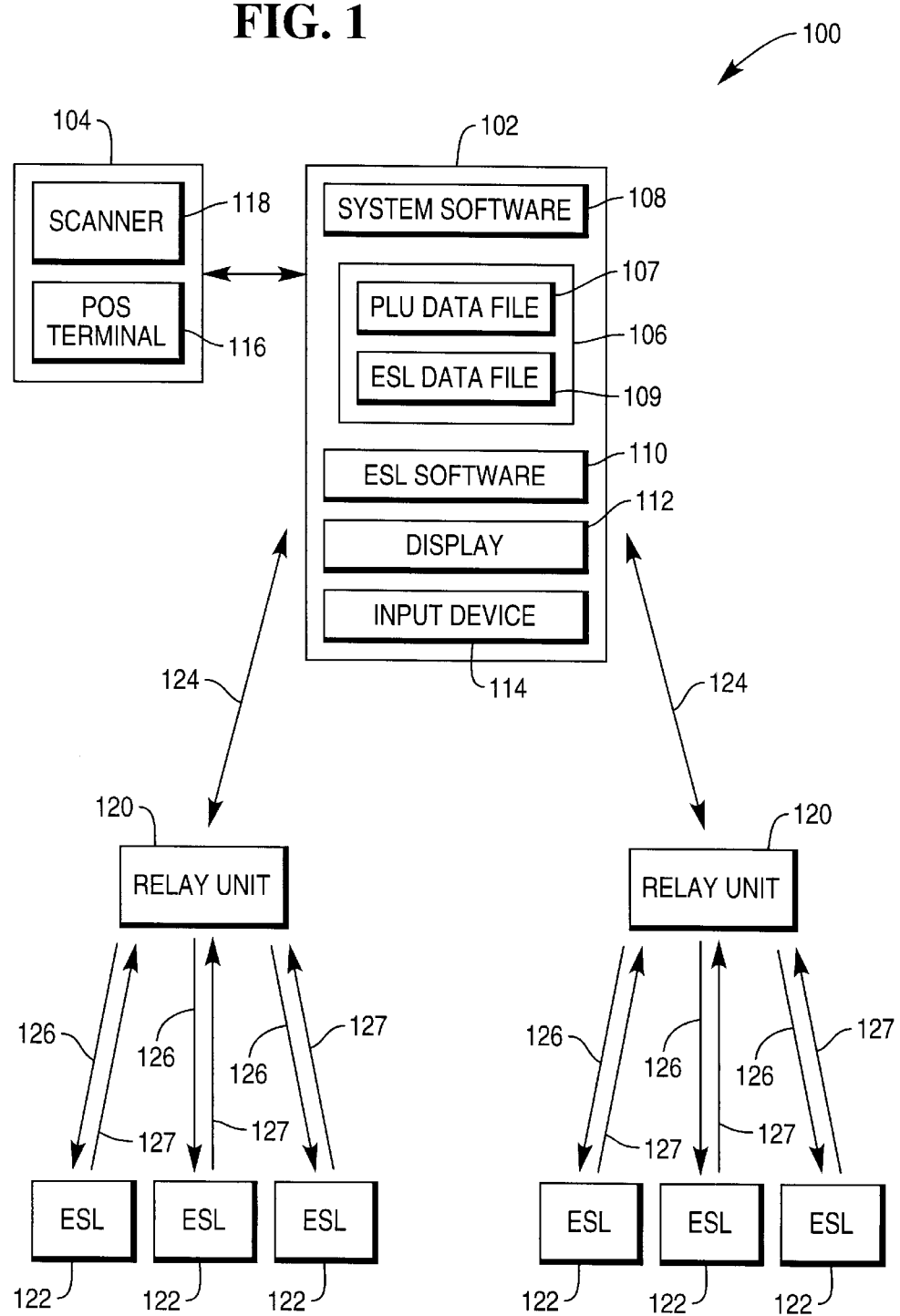
FIG. 1 is a block diagram of a transaction management system in accordance with the present invention.

FIG. 1 shows a transaction management system 100 in accordance with the present invention. The system 100 includes a host computer system 102 and a point-of-service (POS) system 104. Here, components 102 and 104 are shown as separate components that are networked together, but they and their subcomponents may also be combined or divided in various ways. Thus, host computer system 102 may be a POS terminal which doubles as a host computer for a network of other POS terminals.

The host computer system 102 includes a storage medium 106, system software 108, ESL software 110, a display 112 and an input device 114. The storage medium 106 includes a PLU data file 107 which stores item prices which are available for distribution to a POS terminal 116 by the host system 102. Alternatively, provision may be made for a bar code scanner 118 to directly access the PLU data file 107. The storage medium 106 also includes ESL data file 109 which contains item information, such as a PLU number and ESL identification information for each of the ESLs 122. The system 102 executes system software 108 which updates the contents of storage medium 106 and performs other system functions, as described in greater detail below. Input device 114 is preferably a keyboard, but it will be recognized that data can be entered in a variety of alternative manners.

POS system 104 includes bar code scanner 118 and POS terminal 116.

The system 100 also includes relay units 120 and ESLs 122. The relay units 120 may be suitably mounted in or near the ceiling of the retail establishment.

ESL software 110 records, schedules, and transmits all messages to ESLs 122. ESL software 110 controls the transmission of messages, including price change messages, to ESLs 122 utilizing relay units 120 which are placed periodically across a retail establishment. These messages are sent to the relay array units 120 through communications link 124. Communications link 124 may suitably utilize radio frequency (RF) communication, infrared (IR) communication, a wired link, or some combination of communication techniques. After receiving a message from the host system 102, the relay units 120 then transmit the message to the ESLs 122 utilizing a further communications link 126, which may suitably utilize RF communication, IR communication, a wired link or some combination of communication techniques. In an alternate embodiment, host system 102 may communicate directly with ESLs 122.

After receiving a message, the ESLs 122 may respond with an acknowledgement which is transmitted to the relay units 120 over communication link 127, as described in greater detail below. The relay units 120 would then retransmit the acknowledgement message to the host system 102 over communication link 124.

Figure 2:
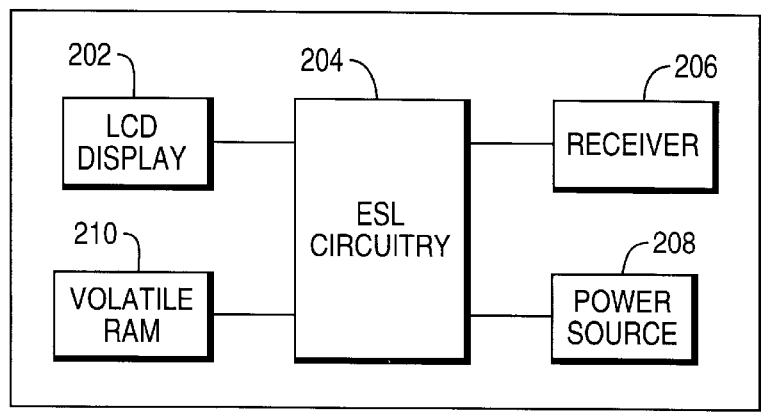
FIG. 2 is a block diagram of an ESL in accordance with the present invention.

FIG. 2 shows a block diagram of the ESL 122 in accordance with the present invention. A liquid crystal display (LCD) 202 displays information, such as item price and related data. ESL 122 includes a receiver 206 for receiving messages from the relay unit 120. The receiver may utilize RF communication, IR communication, a wired link or some combination of communication techniques. A power source 208 provides power for the operation of ESL 122. The operation of ESL 122 is controlled by ESL circuitry 204 which decodes incoming messages received and performs any actions indicated by the messages. For example, if a price change message is received, the ESL circuitry 204 would cause the display 202 to be updated with the new price information. Volatile RAM 210 stores the ESL identification number and the displayed message. ESL circuitry 204 may also include a variety of components such as timers and other electronic components.

Figure 3:
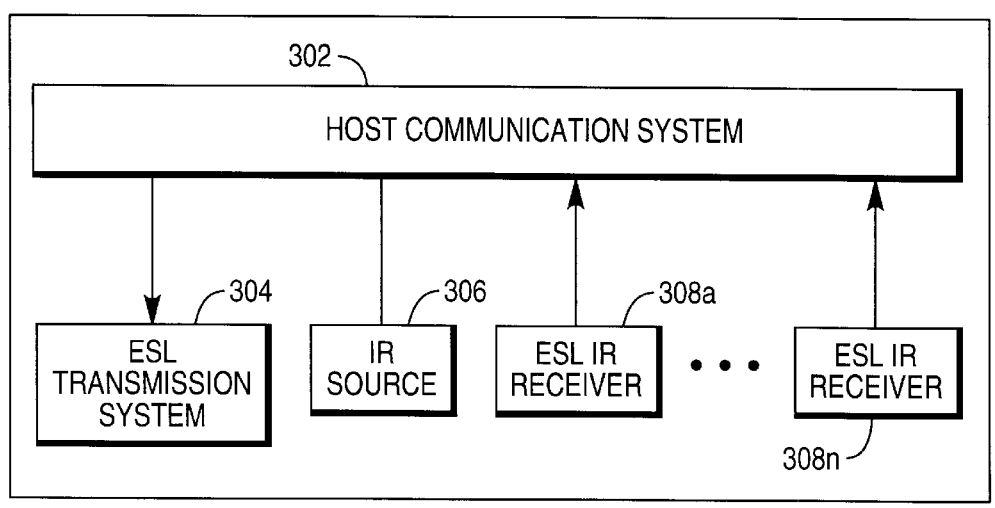
FIG. 3 is a block diagram of a relay unit in accordance with the present invention.

FIG. 3 shows a block diagram of the relay unit 120 in accordance with the present invention. A host communication system 302 provides an interface to the host system 102. Messages to the ESLs 122 are transmitted by an ESL transmission system 304 over the communications link 126, as described above. An infrared (IR) source 306 generates infrared light which is used to flood an area containing ESLs with IR light. A plurality of ESL IR receivers 308a . . . 308n receive and interpret the infrared light which has been reflected by an ESL 122. While the relay unit 120 is shown as a single device for ease of illustration, as would be understood by one skilled in the art, the present invention is not so limited and may be implemented as separate units.

Figure 4:
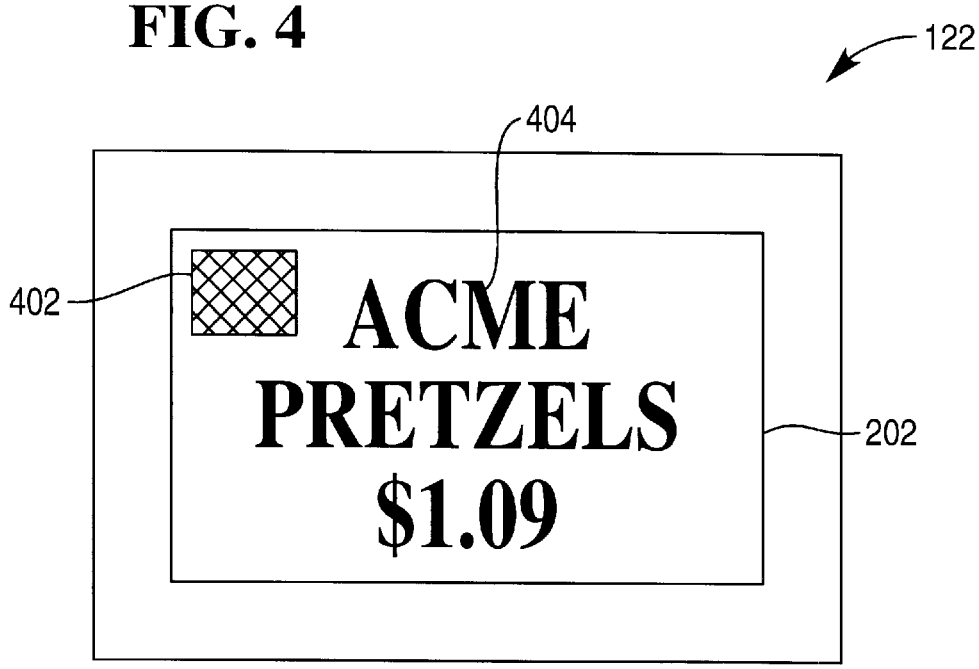
FIG. 4 is a frontal view of an ESL in accordance with the present invention.

After receiving a message transmitted from the relay unit 120, the ESL 122 responds by sending an acknowledgement message to the relay unit 120. The ESL 122 reflects and modulates the IR light transmitted from the relay unit 120. In a preferred embodiment, the ESL 122 modulates the IR light by blinking a special segment 402 of the LCD display 202, as shown in FIG. 4. In another aspect, the ESL 122 blinks some or all of the segments 404 which are used to display information. The blinking of a display segment varies the reflectivity of the segment with respect to IR light, thus varying the IR light which is reflected from the display. Such blinking may advantageously occur at a frequency at or above 30 cycles per second in order to prevent the blinking from being visible to a customer in the retail establishment. Since the IR light is reflected off many surfaces in the retail establishment, the EPL 122 does not need to be located in a direct line of sight from the relay unit 120.

In an alternate embodiment of the present invention, the relay unit 120 does not flood the retail establishment with IR light. Instead, the ESL 122 reflectively modulates visible light to transmit a message or response to the relay unit 120 which may use a camera or other suitable optical receiver to receive the message.

Figure 5:
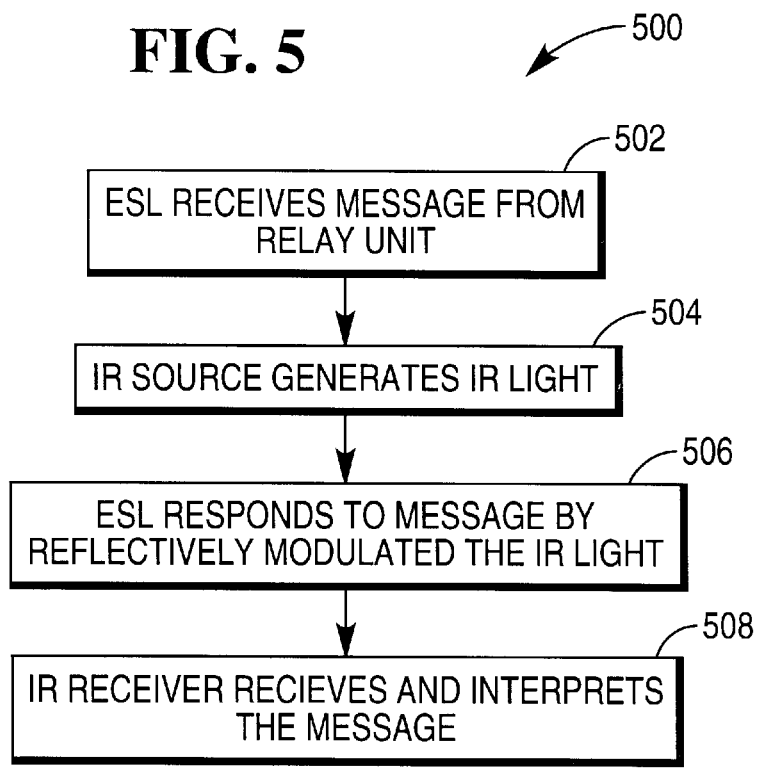
FIG. 5 shows a method of communicating with an ESL in accordance with the present invention.

FIG. 5 shows a method 500 of communicating with an ESL in accordance with the present invention. In step 502, an ESL, such as ESL 122, receives a message from a relay unit. In step 504, an infrared (IR) light source, such as IR source 306, floods the ESL with IR light. In step 506, the ESL responds to the message by reflectively modulating the IR light. In a preferred embodiment, the ESL reflectively modulates the IR light by blinking, or repetitively turning on and off, at least one segment of the ESL's liquid crystal display (LCD). In step 508, an IR receiver, such as ESL IR receiver 308a, receives the reflectively modulated IR light and interprets the message.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

I claim:

1. An electronic shelf label (ESL) system comprising:

an infrared (IR) light source for generating IR light;

an ESL comprising a display having a plurality of segments, a portion of the segments displaying information and at least one of the segments blinking on and off to reflectively modulate the IR light to transmit a message; and an IR receiver for receiving the reflectively modulated message.

2. The ESL system of claim 1 wherein the display is a liquid crystal display.

3. The ESL system of claim 1 wherein the displayed information relates to an item offered for sale.

4. The ESL system of claim 1 wherein the at least one blinking segment is one of the segments displaying information relating to an item offered for sale.

5. The ESL system of claim 1 wherein the at least one blinking segment blinks at a rate of at least about 30 cycles per second.

6. The ESL system of claim 1 wherein the ESL is for transmitting the message in response to a command transmitted from a host system.

7. An electronic shelf label (ESL) system comprising:

a light source for generating visible light;

an ESL comprising a display having a plurality of segments, a portion of the segments displaying information and at least one of the segments blinking on and off to reflectively modulate the visible light to transmit a message; and a receiver for receiving the reflectively modulated message.

8. The ESL system of claim 7 wherein the display is for displaying price information of an item.

9. The ESL system of claim 7 wherein the display is a liquid crystal display.

10. An electronic shelf label communication method by an ESL comprising a display having a plurality of segments, a portion of the segments displaying information, the method comprising the steps of:

(a) generating infrared (IR) light by an IR light source;
(b) reflectively modulating the IR light by the ESL blinking on and off at least one of the segments to transmit a message; and
(c) receiving the reflectively modulated IR light by a receiver.

11. The method of claim 10 further comprising the step of:
interpreting the reflectively modulated light to decode the message.

12. The method of claim 10 wherein the display is a liquid crystal display.

13. The method of claim 10 further comprising the step of transmitting a signal to the ESL and wherein the message is transmitted in response to the signal.

14. An electronic shelf label (ESL) system comprising:
an infrared (IR) light source for generating IR light to illuminate an area including an ESL;
the ESL comprising a display having a plurality of segments, a portion of the segments displaying information and at least one of the segments blinking on and off to reflectively modulate the incident IR light to transmit an acknowledgement message in response to a received command; and
an IR receiver for receiving the reflectively modulated message.

15. The ESL system of claim 14 further comprising a relay unit including the IR receiver.

* * * * *